UNITED STATES PATENT OFFICE.

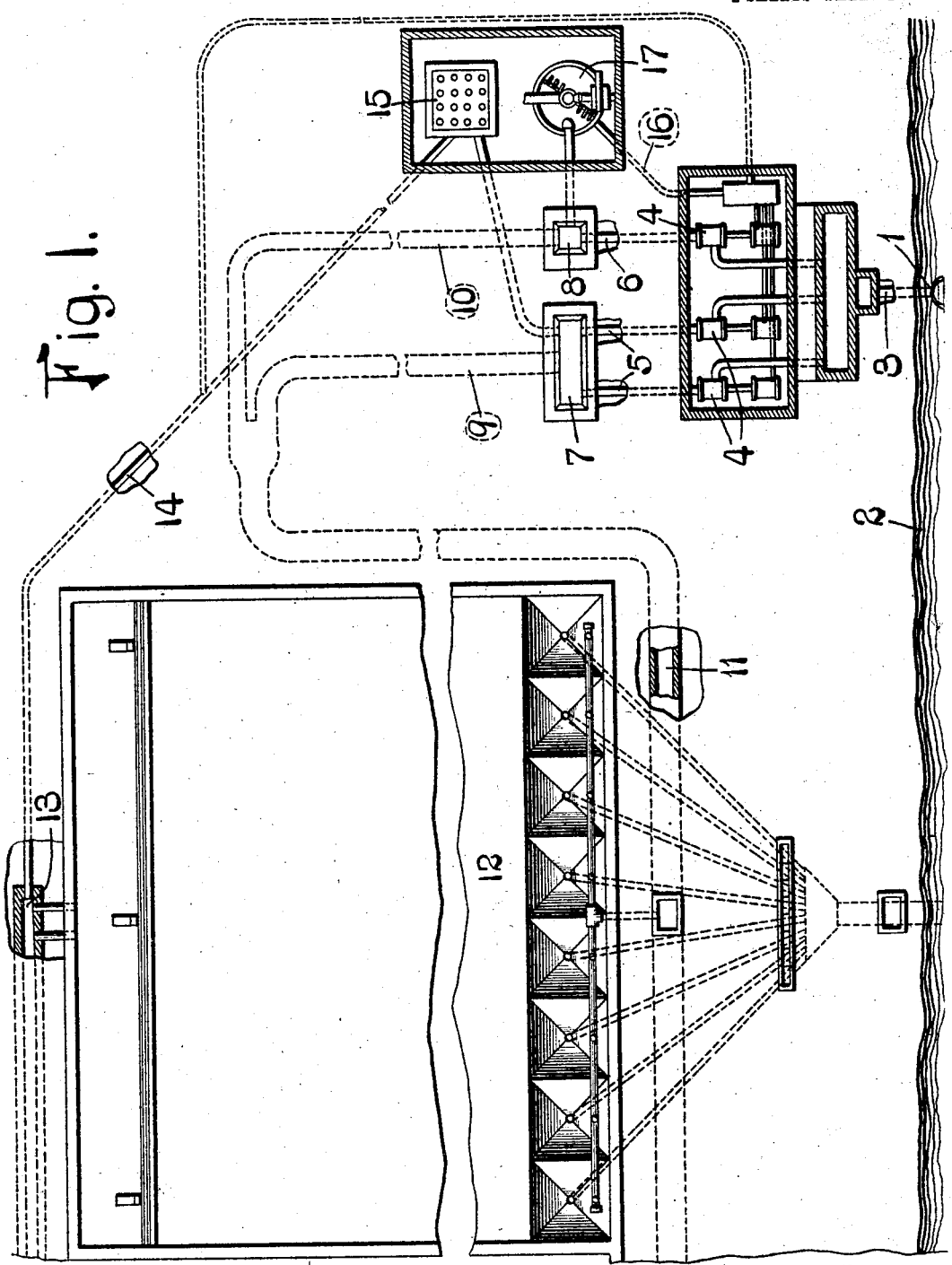

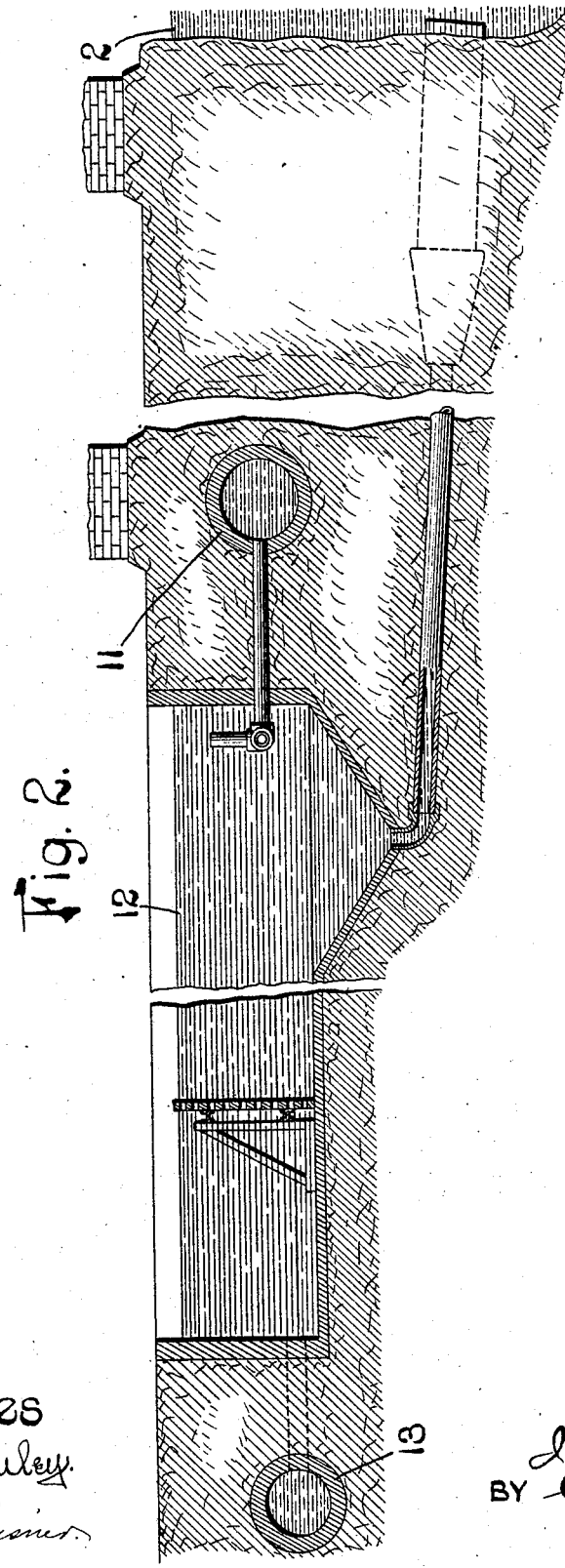

JOHN F. WIXFORD, OF ST. LOUIS, MISSOURI.

PROCESS OF PURIFYING WATER.

No. 807,008. Specification of Letters Patent. Patented Dec. 12, 1905.

Continuation of application Serial No. 225,611, filed September 23, 1904. This application filed June 26, 1905. Serial No. 266,948.

*To all whom it may concern:*

Be it known that I, JOHN F. WIXFORD, a citizen of the United States, and a resident of the city of St. Louis, State of Missouri, have invented a new and useful Process of Purifying Water, of which the following is a specification.

It is noted that this application is in continuation, in part, of my earlier application, Serial No. 225,611, filed September 23, 1904.

My invention relates to the purification of water, and has for its principal objects to utilize portions of the undesirable matter naturally contained in the water in aid of the reagents added thereto, also to shorten the time required for the settling of the sediment, also to eliminate the danger of leaving a discoloring agent in the clarified water, also to attain other advantages hereinafter specified.

Many natural waters, such as the water of the Mississippi river, contain in solution a considerable proportion of bicarbonates of calcium and magnesium and contain in suspension large quantities of mineral and organic matter, and my process is especially adapted for the treatment of such waters.

My invention consists principally in converting the dissolved carbonates into insoluble compounds in the presence of a coagulant. It also consists in generating a coagulant in the water and converting the dissolved carbonates into insoluble compounds. It also consists in the details hereinafter described and claimed.

In the accompanying drawings, which form part of this specification, and wherein like symbols refer to like parts wherever they occur, Figure 1 is a plan view of a system adapted for use with my process, and Fig. 2 is a vertical sectional view through the settling-basin of such system.

The mechanical system illustrated in the accompanying drawings comprises an intake-tower 1, located in the river or other source of water-supply 2; a conduit 3, leading from the intake-tower to pumps 4, located on shore; two conduits 5 6, leading from the respective pumps to separate delivery-wells 7 8; conduits 9 10, leading from the delivery-wells to the flow pipe or conduit 11, which communicates with one or more settling-basins 12, and one or more outlet-pipes 13, leading from the settling-basins to the distribution system.

In addition to the foregoing arrangement the system shown in the drawings comprises a clear-water pipe 14, leading from the distribution system through a digester or solution-tank 15 and into one of the delivery-wells 7. It also comprises a second clear-water pipe 16, leading from a source of hot water through a second digester or solution-tank 17, especially arranged for the preparation of milk of lime, and into the second of the delivery-wells.

In the practice of my process as hereinafter stated various reagents may be used; but for the sake of simplicity of description I shall first describe it as practiced with ferrous sulfate.

At definite intervals measured quantities of ferrous sulfate are placed in the digester 15, through which a constant stream of water is flowing continuously. In consequence of this arrangement a solution of ferrous sulfate of constant strength is continuously prepared and fed into the delivery-well 7. At the same time measured quantities of lime are fed at regular intervals into the lime-digester 17, which is provided with mechanical agitators and through which a stream of hot water is flowing continuously. By this arrangement a constant amount of hydrate of lime, mostly in the form of milk of lime, is continuously prepared and fed into the second delivery-well 8.

The reason for using hot water in preparing the milk of lime is that it is impracticable to slake lime in a running stream of cold water.

The water in the delivery-wells 7 8 is violently agitated, whereby the reagents added thereto in the respective delivery-wells are thoroughly mixed with the raw water therein. During the time that the water takes to flow from the delivery-wells to the point where the two streams unite both of the reagents undergo reactions. The principal reaction of the ferrous sulfate is with the dissolved carbonates, which reaction results in the formation of ferrous bicarbonate. The principal reactions of the lime are, first, its reaction with the dissolved bicarbonates, which reaction results in the formation of insoluble normal carbonate, and, second, a coagulating action upon the particles of clay in suspension. Much of the lime dissolves and remains in solution. The movement of the water from the delivery-wells to the sedimentation-basin produces a sufficiently violent agitation to prevent the deposition in the conduits 9 10 11 of precipitates and suspended matter.

When the two streams—namely, those treated with the ferrous sulfate and the hydrate of lime, respectively—unite, there are two principal reactions. One is the reaction of the lime with the ferrous bicarbonate, resulting in the formation of ferrous hydrate, and the other is the reaction of the lime upon the dissolved carbonates, resulting in the formation of the insoluble normal carbonates. The ferrous hydrate quickly oxidizes to ferric hydrate. These reactions are accompanied with other reactions of minor importance. The most important of the minor reactions appears to be the reaction of the lime with the clay in suspension, which produces a flocculation of the clay particles.

Ferrous and ferric hydrates, particularly the latter, are heavy flocculent precipitates of great coagulating power, while the normal carbonate of calcium is a very finely divided white precipitate which forms slowly and remains in suspension for a long time. As stated above, the water is kept in a state of agitation sufficient to prevent sedimentation until it reaches the settling-basin. Consequently the large heavy particles of iron precipitate kept in suspension in the moving water constitute nuclei around which agglomerates the lighter and late-forming carbonate of calcium as well as the organic and mineral matter originally in suspension or precipitated by the chemical reactions. In order to permit this action, the length of the conduit 11 from the point where the two streams come together to the settling-basin should be sufficient to require from three to fifteen minutes time for the water to traverse it. When the water enters the settling-basin, the agglomerated particles settle rapidly, leaving the supernatant water very clear.

The probable reactions of the lime are as follows: All of the free carbonic acid ($CO_2$) is rapidly converted into insoluble normal calcium carbonate, and all of the ferrous bicarbonate is rapidly converted into insoluble calcium carbonate and ferrous hydrate. Calcium bicarbonate is changed into insoluble normal calcium carbonate, bicarbonate of magnesia is changed to insoluble magnesium carbonate and magnesium hydrate, and some of the silicates in the water are changed to calcium silicate and probably some other insoluble silicate. It is to be understood, of course, that the foregoing reactions are accompanied with reactions of lime upon other matter, such as sulfate of magnesium or organic matter, if any is present in the water.

On account of the above-mentioned reactions with the bicarbonates and silicates occurring principally after the free carbonic acid ($CO_2$) and the ferrous sulfate have been completely satisfied the amount of the carbonates and silicates affected will be proportional to the amount of lime in excess of that needed to satisfy the free carbonic acid and the iron. Usually it is unnecessary for clarification purposes to react upon all of the carbonates and silicates in the water, and it is not usually desirable to entirely eliminate them from drinking-waters.

On account of its great coagulating power and heavy weight ferric hydrate constitutes the principal coagulant and tends to produce rapid precipitation; but the hydrate of magnesium and some of the insoluble silicates are also coagulants and operate in conjunction with the ferric hydrate.

The ferrous sulfate is intended to be converted into a coagulant, and it is obvious that the amount of coagulant required will increase as the amount of suspended matter increases and as such matter is lighter and more finely divided. As the sulfates of calcium and magnesium resulting from the addition of ferrous sulfate remain in the clarified water, it is advisable to limit the amount of ferrous sulfate to what is needed (when supplemented by the other coagulants) to produce the desired coagulating action. In the case of water from the Mississippi river at St. Louis one-half of a grain of ferrous-sulfate crystals (or their equivalent of the anhydrous form) to one gallon of water is sufficient when the river is clearest, whereas three grains or more of crystals (or their anhydrous equivalent) may be necessary to promptly precipitate the suspended matter when the river is very turbid. On account of the extreme fineness of the clay particles in the water it is probable that certain portions thereof act in the manner of a colloidal solution and that the lime reacts thereon as such. The amount of lime to be added increases with the amount of free carbonic acid and with the amount of iron added to the water. The amount of lime also increases proportionately to the amount of carbonates (and silicates) remaining in the water after the free and uncombined carbonic acid ($CO_2$) and ferrous sulfate shall have been satisfied. In the case of the Mississippi-river water at St. Louis the amount of lime required for the best and most economical results varies from about four grains to the gallon of water to eight or even more grains.

The amount of lime that can be usefully employed in this process for clarifying and elimination purposes is determined by two factors: first, the amount of such matter in the natural water (whether in solution or in suspension) as reacts with lime and, second, the amount of ferrous sulfate added to the water. These factors are obvious when the lime is added before the ferrous sulfate, in which case the matter in the water will first become satisfied with lime, after which the subsequently-added ferrous sulfate remains to be satisfied. The quantity is substantially the same, however, when the ferrous sulfate is added first, for while the ferrous sulfate first reacts with the bicarbonate of calcium in the raw water, and thereby converts part of the lime into the subsequently inert form of calcium sulfate, the same reaction produces ferrous bicarbonate, which requires to satisfy it as much lime as the amount rendered inert as calcium sulfate. Any excess of lime above the total of these two factors will result in making the clarified water caustically alkaline, which condition is usually undesirable. On the other hand, when the ferrous sulfate is added first and is followed by an amount of lime less than the total amount of these two factors the clarified water will retain a portion of the salts naturally belonging thereto. As it is usually desirable to retain a portion of such salts, the proper amount of lime to be added in the practice of my process under ordinary conditions is approximately the same as the amount of the first factor above stated—namely, the amount that can be taken up by the raw water. This amount may be determined by adding hydrate of lime to the raw water in various proportions and after the lapse of some hours testing for alkalinity. For this purpose nitrate of silver is used (in the absence of strong sunlight) as an indicator, and the amount of lime required to be added to the raw water to show a brown precipitate immediately upon the addition of nitrate of silver thereto after the lapse of several hours from the time when the lime was added is the amount of lime that reacts with or is taken up by the matter in the water, and this amount usually furnishes the proper proportions for use in municipal water-supply systems. In the case of the Mississippi-river water at St. Louis the proper amount of lime will vary from four to eight grains per gallon of water, depending upon the condition of the water.

A more rapid method of ascertaining the amount of lime that can be taken up by the raw water is as follows: To a measured quantity of water to be treated there is added a measured quantity of lime-water more than sufficient to react with the constituents of the water. After agitation for several minutes and settling until the water is moderately clear a measured volume is decanted and silver nitrate added thereto in excess of the quantity needed to combine with any chlorids the water may contain, whereby a brown precipitate of hydroxid of silver is formed. Decinormal sulfuric acid is then titrated from a burette until the brown color disappears. This quantity of sulfuric acid measures the excess of lime added, and this amount of lime subtracted from the total amount added gives the amount of lime the water will take up. This method must be carried on in the absence of strong sunlight, because if there are any chlorids in the raw water chlorid of silver will be formed and will quickly turn black in strong sunlight. This method of titration with decinormal sulfuric acid may be advantageously varied as follows: After adding the lime-water to the raw water and agitating and settling, a measured volume of the treated water is filtered and a few drops of phenolphthalein added thereto to give it a red color. Decinormal sulfuric acid is then added from a burette until the red color disappears. The amount of decinormal sulfuric acid used measures the excess of lime in the sample, and this deducted from the total amount of lime originally added gives the amount of lime taken up by the water.

It is important that the lime and iron should be thoroughly mixed with the water and uniformly distributed therein in definite proportions. For this purpose the following method is most satisfactory in large plants: A quantity of ferrous sulfate equal to the supply required for the treatment of the amount of water issuing from the pump-pipe during a predetermined interval is placed in the receptacle or digester 15, through which a constant volume of water is continuously passing. At the end of the first interval an additional amount of ferrous sulfate sufficient for the treatment of the water for the next interval is added to the receptacle, and this addition of ferrous sulfate is repeated for each interval. Preferably the water flows upwardly through the ferrous sulfate, and as the mass of water flowing through the ferrous sulfate is uniform the accumulation of ferrous sulfate in the receptacle will soon reach such an amount as to render the rate of solution of ferrous sulfate substantially uniform—that is to say, that the amount of ferrous sulfate dissolved in the water during the interval will equal the amount of ferrous sulfate added to the tank for said interval. The volume of water passing through the receptacle is preferably regulated so as to require a large mass of ferrous sulfate in the receptacle to bring about a periodic solution equal to the mass of the ferrous sulfate added for the period, in which case the rate of solution is substantially uniform throughout the entire period. The amount of ferrous sulfate to be added may be varied from time to time according as the water supplied by the pump varies. The water flowing from the receptacle containing the ferrous sulfate is delivered directly into the water from one or more of the pumps, preferably at such point as to secure a thorough distribution of the iron throughout the water before it reaches the settling-basins and before the lime is added thereto. Obviously, however, it is permissible to make up the ferrous-sulfate solution in advance and deliver such solution from the storage-tank in more or less concentrated form.

The lime is preferably used in the form of milk of lime. For this purpose measured quantities of lime are placed in a receptacle or digester 17, through which a constant volume of hot water is continuously flowing, and the lime is continuously agitated in said receptacle. The water containing the hydrate of lime is delivered directly into one stream of the water to be treated. At predetermined intervals additional measured quantities of lime are placed in the receptacle, so that eventually the amount of lime issuing from said receptacle becomes substantially uniform.

According to the foregoing description the water to be treated is divided into two streams, to the smaller of which the lime is added and to the larger of which the ferrous sulfate is added. In consequence of this arrangement the ferrous sulfate is converted into ferrous bicarbonate, and the lime is mostly in solution by the time the respective streams containing these reagents unite. The two reagents may, however, be added to the same stream, in which case the ferrous sulfate is preferably added to the water before the water reaches the point where the hydrate of lime is added, so that the white precipitates of the lime reactions are formed after and upon the red iron precipitates. This result is due to the fact that the reaction of the lime upon the iron in solution is quite rapid and produces a heavy flocculent precipitate, whereas some of the reactions of the lime upon the other matter in the water are slower and produce light and very finely-divided precipitates. These reactions occur mainly in the stream of running water, and the heavy iron precipitate is carried along in suspension and forms nuclei for the lighter and later forming precipitates to agglomerate around. Consequently when the water reaches the settling-basin and becomes quiet the sedimentation is very rapid.

In the purification of water in large quantities it is important to shorten the time required for settling as much as practicable, and this object is attained by my invention, wherein the coagulant action of the ferric hydrate in conjunction with the hydrate of magnesia and the insoluble silicates causes the rapid settling of the light precipitate of carbonate of lime and the fine suspended matter which would otherwise require a long period of settling.

On account of the large demands made upon the water-supply systems it is frequently impracticable to allow the water to stand long enough for all of the suspended matter to settle, in consequence of which the water from the settling-basin contains more or less fine particles in suspension. This fine matter is usually either removed by filtration or passes into the distribution-pipes. In other processes, where iron is used for purifying water, this suspended matter sometimes discolors the water, but always causes the water to stain whatever it comes in contact with. The necessity for a filter and the danger of staining constitute the principal objections to the use of iron for purifying water. By my process, however, the necessity for a filter and the danger of the water staining are both eliminated, the filter being unnecessary by reason of the strong coagulating action and rapid settling above described and the staining power of the ferric hydrate being removed by reason of its particles having a thick whitish coating of carbonate of lime and hydrate of magnesia and other matter.

Another advantage of my invention is that the soluble silicates are not only eliminated, but actually utilized for the elimination of other matter.

Another advantage is that substantially all of the bacteria and other organic matter are eliminated.

My process admits of considerable modification without departing from my invention. Thus other soluble mineral salts of iron may be substituted for the ferrous sulfate, in which case the carbonate of lime is changed into the corresponding salt of calcium instead of the sulfate, and such salt either remains permanently in the water if it is soluble or is precipitated if it is insoluble. The particular advantage of iron sulfate, however, is its cheapness. So, too, instead of iron salts other metal sulfates may be used, such as sulfate of copper, zinc, manganese, or aluminium.

What I claim is—

1. The process of purifying water which consists in adding thereto a solution of a metallic sulfate and a quantity of lime approximately equal to the amount of lime required to be added to the raw water to make it give a caustically-alkaline reaction.

2. The process of purifying water which consists in adding thereto separately a solution of a metallic sulfate and a quantity of lime approximately equal to that required to be added to the raw water to make it indicate caustic alkalinity after a considerable time when tested with nitrate of silver.

3. The process of purifying water which consists in adding thereto separately a solution of a metallic sulfate and a quantity of lime approximately equal to that required to make the raw water indicate caustic alkalinity after a considerable time when tested with nitrate of silver, and keeping the water agitated for several minutes and then permitting sedimentation.

4. The process of purifying water which consists in adding thereto a solution of a mineral salt of iron and treating it with hydrate of lime, the proportion of lime being approximately the same as that required to be added to the raw water to make it indicate caustic alkalinity.

5. The process of purifying water which consists in adding thereto a solution of a mineral salt of iron and treating it with hydrate of lime, the proportion of lime being approximately the same as that required to make the raw water indicate caustic alkalinity, keeping the water agitated for several minutes and then permitting sedimentation.

6. The process of purifying water which consists in treating it with hydrate of lime in the presence of a coagulant, the proportion of lime being practically the same as that required to make the raw water indicate caustic alkalinity when tested with nitrate of silver several hours after the addition of lime.

7. The process of purifying water which consists in treating it with hydrate of lime in the presence of a coagulant, the proportion of lime being practically the same as that required to be added to the raw water to make it indicate caustic alkalinity when tested with nitrate of silver several hours after the addition of lime, and keeping the water agitated for several minutes and then permitting sedimentation.

8. The process of purifying water which consists in adding thereto a sulfate of iron and then treating it with hydrate of lime, the proportion of lime being approximately the same as that required to be added to the raw water to make it indicate caustic alkalinity when tested with silver nitrate a considerable time after the addition of lime.

9. The process of purifying water which consists in adding thereto a sulfate of iron and then treating it with hydrate of lime, the proportion of lime being approximately the same as that required to be added to the raw water to make it indicate caustic alkalinity when tested with silver nitrate a considerable time after the addition of lime, and keeping the water agitated for several minutes and then permitting sedimentation.

10. The process of purifying water of the kind described which consists in adding ferrous sulfate thereto in the proportion of from one-half of a grain to three grains per gallon of water, and adding lime in the proportion of from four to eight grains per gallon of water.

11. The process of purifying water of the kind described which consists in adding ferrous sulfate thereto in the proportion of from one-half of a grain to three grains per gallon of water, and adding lime in the proportion of from four to eight grains per gallon of water, and keeping the water agitated for several minutes and then permitting sedimentation.

12. The process of purifying water which consists in keeping the same in motion sufficient to keep the precipitates in suspension and treating the water while thus in motion with a solution of a metallic sulfate and then with hydrate of lime, and afterward reducing the rate of flow to permit sedimentation, the proportion of lime being approximately the same as that required to make the raw water indicate caustic alkalinity when tested with silver nitrate a considerable time after the addition of lime.

13. The process of purifying water which consists in keeping the water in motion sufficiently violent to prevent sedimentation and treating the same while in motion with a solution of a metallic sulfate and adding hydrate of lime to the moving water thus treated, and afterward reducing the rate of flow to permit sedimentation, the proportion of lime being approximately the same as that required to be added to the raw water to make it indicate caustic alkalinity when tested with silver nitrate a considerable time after the addition of lime.

14. The process of purifying water which consists in continuously directing into a stream thereof separate streams containing a sulfate of iron and hydrate of lime, respectively, and afterward permitting the water to settle, the stream containing the hydrate of lime being directed into the main stream at a point beyond the point where the stream containing the ferrous sulfate enters said main stream, the quantity of sulfate of lime being approximately one grain per gallon of the raw water and the quantity of lime being approximately equal to the amount of lime required to be added to the raw water to make it give a caustically-alkaline reaction.

15. The process of purifying water which consists in continuously directing into a stream thereof separate streams containing a sulfate of iron and hydrate of lime, respectively, keeping the treated water sufficiently agitated to prevent sedimentation for several minutes, and afterward permitting the water to settle, the hydrate of lime being added at a point in the stream beyond the point where the iron is added, substantially in the proportions and for the purpose described.

16. The process of purifying water which consists in adding a sulfate of iron to one stream thereof and lime to a second stream thereof, causing the water of said streams to unite soon after they are treated with such reagents, keeping the commingled water of the two streams agitated for several minutes sufficiently to prevent sedimentation, and afterward permitting the water to settle, the sulfate and lime being added in substantially the proportions specified.

17. The process of purifying water which consists in continuously adding to a stream thereof a dilute solution of sulfate of iron and continuously adding hydrate of lime to that portion of the water in the stream which is already treated with ferrous sulfate, the lime being at least eight times the quantity required to satisfy the sulfate added to the water.

18. The process of purifying water which consists in keeping the same in motion and continuously adding thereto a sulfate of iron and hydrate of lime in substantially the proportion of one grain of ferrous sulfate and six grains of hydrate of lime per gallon of water, the lime being added to the main stream at a point beyond the point of admission of the sulfate and in excess of the amount required to satisfy the free carbonic acid and the sulfate in the water, said reagents being added by means of streams of water running continuously through masses of the respective reagents to which measured quantities are added at intervals to secure uniformity of distribution.

19. The process of purifying water which consists in adding to a stream of water to be purified approximately one grain of ferrous sulfate per gallon and approximately six grains of hydrate of lime per gallon, and then permitting such water to settle, the lime being added to such stream at a point beyond the point of admission of the ferrous sulfate.

20. The process of purifying water which consists in adding to a stream of water to be purified approximately one grain of ferrous sulfate per gallon and approximately six grains of hydrate of lime per gallon, keeping the water thus treated in a state of agitation for several minutes, and then permitting such water to settle, the lime being added to such stream at a point beyond the point of admission of the ferrous sulfate.

21. The process of purifying water which consists in adding to a stream of water to be purified approximately one grain of ferrous sulfate per gallon and adding to a second stream of such water approximately six grains of hydrate of lime per gallon, causing the water of said streams to unite soon after the addition of said reagents thereto, keeping the commingled water in agitation for several minutes and then permitting such water to settle.

22. The process of purifying water which consists in adding thereto while in motion approximately one grain of ferrous sulfate and approximately six grains of hydrate of lime per gallon, the ferrous sulfate being added before the lime by means of a stream of water flowing continuously through a mass of ferrous sulfate to which measured quantities are added at measured intervals.

JOHN F. WIXFORD.

Witnesses:
FRED F. REISNER,
J. B. MEGOWN.